(12) United States Patent
Lee

(10) Patent No.: US 11,618,409 B2
(45) Date of Patent: Apr. 4, 2023

(54) AUTOMOTIVE SIDE AIRBAG AND METHOD OF FOLDING SAME

(71) Applicant: HYUNDAI MOBIS CO., LTD., Seoul (KR)

(72) Inventor: Jong Seob Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 63 days.

(21) Appl. No.: 17/133,310

(22) Filed: Dec. 23, 2020

(65) Prior Publication Data

US 2021/0221321 A1 Jul. 22, 2021

(30) Foreign Application Priority Data

Jan. 16, 2020 (KR) .................. 10-2020-0005810

(51) Int. Cl.
*B60R 21/237* (2006.01)
*B60R 21/231* (2011.01)

(52) U.S. Cl.
CPC ...... *B60R 21/237* (2013.01); *B60R 21/23138* (2013.01)

(58) Field of Classification Search
None
See application file for complete search history.

(56) References Cited

U.S. PATENT DOCUMENTS

| | | | | |
|---|---|---|---|---|
| 5,899,490 A * | 5/1999 | Wipasuramonton | ...................... B60R 21/237 280/730.2 |
| 6,155,598 A * | 12/2000 | Kutchey | ........... B60R 21/23138 280/730.2 |
| 6,224,092 B1 * | 5/2001 | Sakamoto | ............. B60R 21/237 280/730.2 |
| 8,075,018 B2 * | 12/2011 | Sugimoto | ............. B60R 21/237 280/743.1 |
| 8,960,713 B2 * | 2/2015 | Kim | ...................... B60R 21/237 280/743.1 |
| 10,618,491 B2 * | 4/2020 | Hatakeyama | ......... B60R 21/237 |
| 2004/0021304 A1 * | 2/2004 | Tanase | .................. B60R 21/207 280/730.2 |

(Continued)

FOREIGN PATENT DOCUMENTS

| | | |
|---|---|---|
| CN | 1533939 A | 10/2004 |
| CN | 101181889 A | 5/2008 |

(Continued)

OTHER PUBLICATIONS

Office Action dated Sep. 30, 2022 in corresponding Chinese patent application No. 202011583853.4.

*Primary Examiner* — Faye M Fleming

(74) *Attorney, Agent, or Firm* — NovoTechIP International PLLC

(57) ABSTRACT

A technology of improving the expansion speed and the expansion balance of an airbag cushion by improving the folding structure of the airbag cushion is proposed. An automotive side airbag is provided, in which a first state is implemented by folding a front end of an airbag cushion inside toward a rear end of the airbag cushion, a second state implemented by folding an upper end a lower end of the airbag cushion over a middle portion, and then a third state is implemented by rolling the airbag cushion, and a method of folding the automotive side airbag.

12 Claims, 3 Drawing Sheets

(56) References Cited

U.S. PATENT DOCUMENTS

2011/0241317 A1    10/2011  Lee
2021/0339698 A1 *  11/2021  Azuma ............. B60R 21/23138

FOREIGN PATENT DOCUMENTS

| CN | 101659248 A | 3/2010 |
| JP | 2004-210088 A | 7/2004 |
| KR | 10-2008-0036780 A | 4/2008 |

* cited by examiner

AUTOMOTIVE SIDE AIRBAG AND METHOD OF FOLDING SAME

CROSS REFERENCE TO RELATED APPLICATION

The present application claims priority to Korean Patent Application No. 10-2020-0005810, filed Jan. 16, 2020, the entire contents of which is incorporated herein for all purposes by this reference.

BACKGROUND OF THE INVENTION

Field of the Invention

The present invention relates to an automotive side airbag that improves the expansion speed and the expansion balance of an airbag cushion by improving the folding structure of the airbag cushion, and a method of folding the automotive side airbag.

Description of the Related Art

Airbags are installed in vehicles to protect passengers from shock due to a collision of vehicles.

Such an airbag is normally stowed with an airbag cushion folded in an airbag housing, but when a vehicle collides and a sensor senses the collision, gas is quickly supplied into the airbag cushion by an inflator and the airbag cushion is instantaneously expanded, whereby it is possible to protect a passenger from a shock applied to the vehicle.

However, there are great differences in expansion shape and expansion speed of airbag cushions, depending on the shapes of the airbag cushions folded in an airbag housing.

That is, when the expansion force of an airbag cushion concentrates on any one side, depending on the folding structure of airbag cushions, there is a problem that the airbag cushion may be damaged or the trim of a vehicle may be damaged by the expansion shock of the airbag cushion.

Reinforcing cloth is added to an airbag cushion to prevent damage to the airbag cushion due to expansion shock, but this causes a problem of an increase in manufacturing cost.

Accordingly, there is a need for a folding structure of an airbag cushion that can more quickly expand an airbag cushion while preventing damage to the airbag cushion and parts by preventing the expansion force of the airbag cushion from concentrating on one side.

The description provided above as a related art of the present invention is just for helping understanding the background of the present invention and should not be construed as being included in the related art known by those skilled in the art.

SUMMARY OF THE INVENTION

The present invention has been made in an effort to solve the problems described above and an objective of the present invention is to provide an automotive side airbag that improves the expansion speed and expansion balance of an airbag cushion by improving the folding structure of the airbag cushion, and a method of folding the automotive side airbag.

In order to achieve the objectives of the present invention, an aspect of the present invention provides an automotive side airbag in which a first state is implemented by folding a front end of an airbag cushion inside toward a rear end of the airbag cushion, a second state implemented by folding an upper end a lower end of the airbag cushion over a middle end, and then a third state is implemented by rolling the airbag cushion.

A middle portion of the front end of the airbag cushion may be folded inside to come in contact with an end of a middle portion of the rear end in the first state.

In the second state, rear corners of the upper end and the lower end of the airbag cushion may be folded over a side in the first state such that the upper end and the lower end of the airbag cushion are each formed in a triangular shape; and the triangular upper and lower ends may be folded over the middle end in a rectangular shape.

In the second state, rear corners of the upper end and the lower end of the airbag cushion may be folded inside in the first state such that the upper end and the lower end of the airbag cushion are each formed in a triangular shape; and the triangular upper and lower ends may be folded over the middle end in a rectangular shape.

In the second state, rear corners of the upper end and the lower end of the airbag cushion may be folded over another side in the first state such that the upper end and the lower end of the airbag cushion are each formed in a triangular shape; and the triangular upper and lower ends may be folded over the middle end in a rectangular shape.

The third state having a roll shape may be implemented by rolling the front end to the rear end of the airbag cushion in the second state.

Another aspect of the present invention provides a method of folding an automotive side airbag, the method including: a first step of implementing a first state by folding a front end of an airbag cushion inside toward a rear end of the airbag cushion; a second step of implementing a second state by folding an upper end a lower end of the airbag cushion over a middle end in the first state; and a third step of implementing a third state by rolling the airbag cushion in the second state.

According to the present invention, when the airbag cushion is folded, the front end of the airbag cushion is folded first inside the rear end of the airbag cushion and then the other portions are folded. Accordingly, not only the rolled portion and the portions of the upper end and the lower end, but also the portion of the front end simultaneously expands in the early stage of expansion. Therefore, the present invention has the effect that the airbag cushion more quickly expands, and accordingly, the expansion time of the entire airbag cushion decreases.

Further, since the entire front portion of the airbag cushion is primarily folded inside, when the airbag cushion expands, gas is supplied to the entire front portion and the front portion relatively uniformly expands. Accordingly, the expansion force does not concentrate on any one side of the airbag cushion, thereby preventing damage to the cushion and the trim of a vehicle due to the expansion shock of the airbag cushion.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Exemplary embodiments of the present invention are described hereafter in detail with reference to the accompanying drawings.

Figure 1:
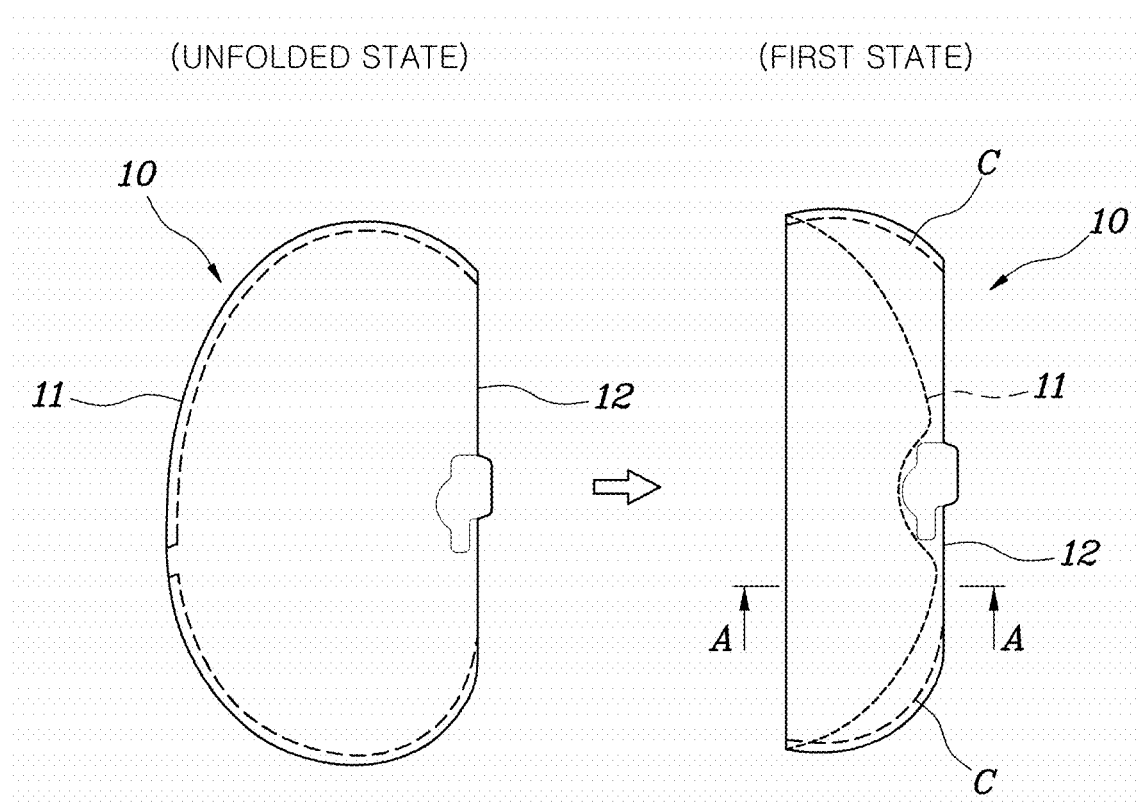
FIG. 1 is a view showing the state when an airbag cushion according to the present invention has been folded into a first state from an unfolded state.
Figure 2:
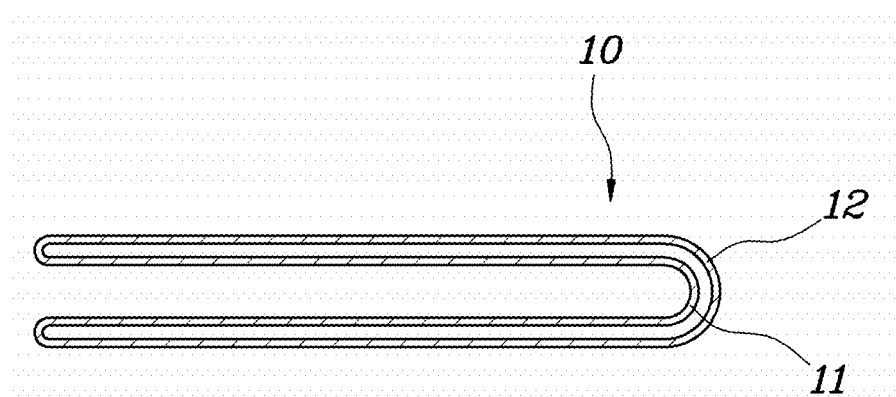
FIG. 2 is a cross-sectional view taken along line A-A when the airbag cushion has been folded in the first state in FIG. 1.
Figure 3:
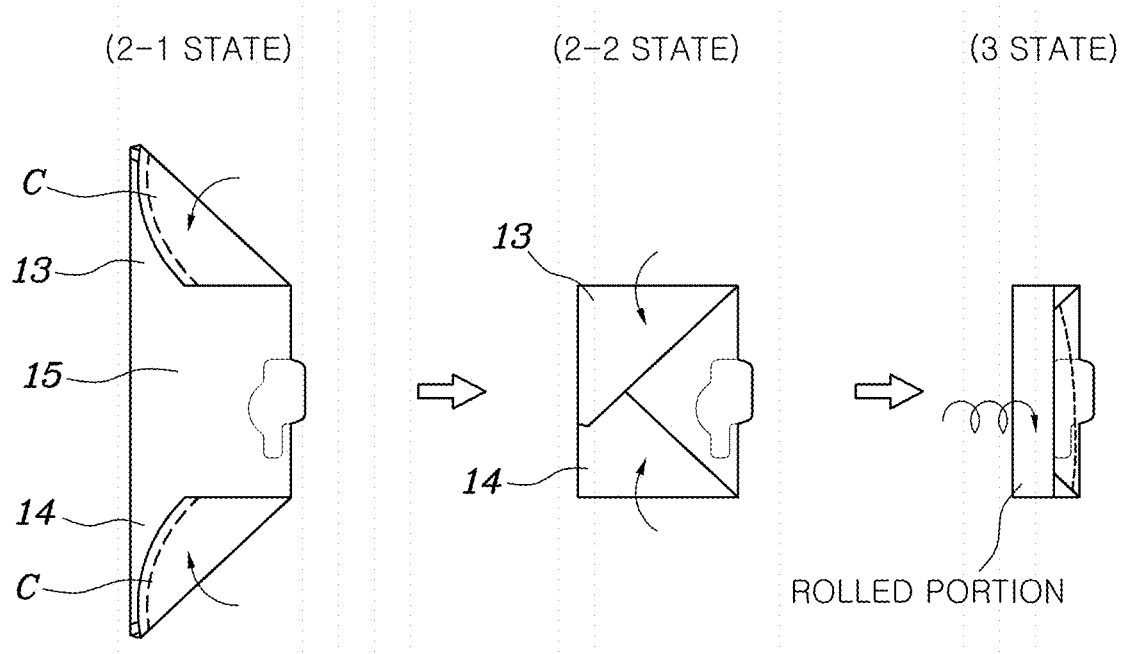
FIG. 3 is a view showing a first embodiment of a process of folding the airbag cushion according to the present invention into a third state from a second state.

FIG. 1 is a view showing the state when an airbag cushion 10 according to the present invention has been folded into a first state from an unfolded state, FIG. 2 is a cross-sectional view taken along line A-A when the airbag cushion 10 has been folded in the first state in FIG. 1, and FIG. 3 is a view showing a first embodiment of a process of folding the airbag cushion 10 according to the present invention into a third state from a second state.

A structure for folding an airbag cushion 10 of an airbag according to the present invention is described with reference to figures. First, the front end 11 of the airbag cushion 10 unfolded flat is folded inside toward the rear end of the airbag cushion 10, whereby a first state is implemented.

The first state may be the state in which the airbag cushion 10 has been folded inside such that the middle portion of the front end 11 comes in contact with the middle portion of the rear end 12.

The upper end 13 and lower end 14 of the airbag cushion 10 is folded to overlap a middle end 15 from the first state, whereby a second state is implemented.

Next, the airbag cushion 10 is rolled in the second state, whereby a third state is implemented.

For reference, an inflator is connected to the rear end 12 of the airbag cushion 10, so gas is supplied from the rear end 12 to the front end 11 of the airbag cushion 10, whereby the airbag cushion 10 expands.

That is, according to the related art, when an airbag cushion is folded, the upper end and the lower end of the airbag cushion are folded first, and in this state, the airbag cushion is rolled from the front end to the rear end, whereby the airbag cushion is folded. Accordingly, when the airbag cushion expands, not only the long rolled portion slowly expands, but also the rolled portion, the upper end, and the lower end sequentially expand, thus there is a problem that the airbag cushion takes a long time to fully expand.

Further, the folded areas at the upper end and the lower end of the airbag cushion are large, so not only the amount of gas that is instantaneously supplied to these portions is relatively large, but also the gas concentrates particularly on the upper end portion. Accordingly, there is a problem that the airbag cushion is damaged or the trim facing the upper end portion of the airbag cushion in a vehicle is damaged by the expansion shock of the airbag cushion.

Therefore, according to the present invention, when the airbag cushion 10 is folded, unlike the related art, the front end 11 of the airbag cushion 10 is folded first inside the rear end 12 of the airbag cushion 10 and then the other portions are folded. Accordingly, not only the rolled portion and the portions of the upper end 13 and the lower end 14, but also the portion of the front end 11 simultaneously expand in the early stage of expansion, whereby the expansion speed of the airbag cushion 10 is improved and the expansion speed of the entire airbag cushion 10 is shortened.

Further, according to the present invention, the entire front portion of the airbag cushion 10 is primarily folded inward, so gas is supplied to the entire front portion when the airbag cushion 10 expands, whereby the front portion relatively uniformly expands. Accordingly, the expansion force of the airbag cushion 10 does not concentrate on any one side, so not only the expansion balance of the airbag cushion 10 is improved, but also damage to the cushion and the trim of a vehicle due to the expansion shock of the airbag cushion 10 is prevented.

Further, since damage to the airbag cushion 10 is prevented, the area of cushion reinforcement cloth provided to protect the airbag cushion 10 decreases, so the thickness of the module of the airbag cushion 10 is decreased and the manufacturing cost is reduced.

FIG. 3 is a view showing a first embodiment of a process of folding the airbag cushion 10 into a third state from the second state, in which the second state can be achieved by folding the airbag cushion 10 into a 2-2 state from a 2-1 state.

Referring to the figure, a rear corner c of the upper end 13 of the airbag cushion 10 and a rear corner c of the lower end 14 of the airbag cushion 10 are folded forward over a side (the inner side of the cushion) in the first state, thereby implementing the 2-1 state in which the upper end 13 and the lower end 14 of the airbag cushion 10 are each formed in a triangular state.

Next, the triangular upper end 13 and lower end 14 are folded to the middle end 15 in the 2-1 state, whereby the airbag cushion 10 is folded in the 2-2 state having a rectangular shape.

Figure 4:
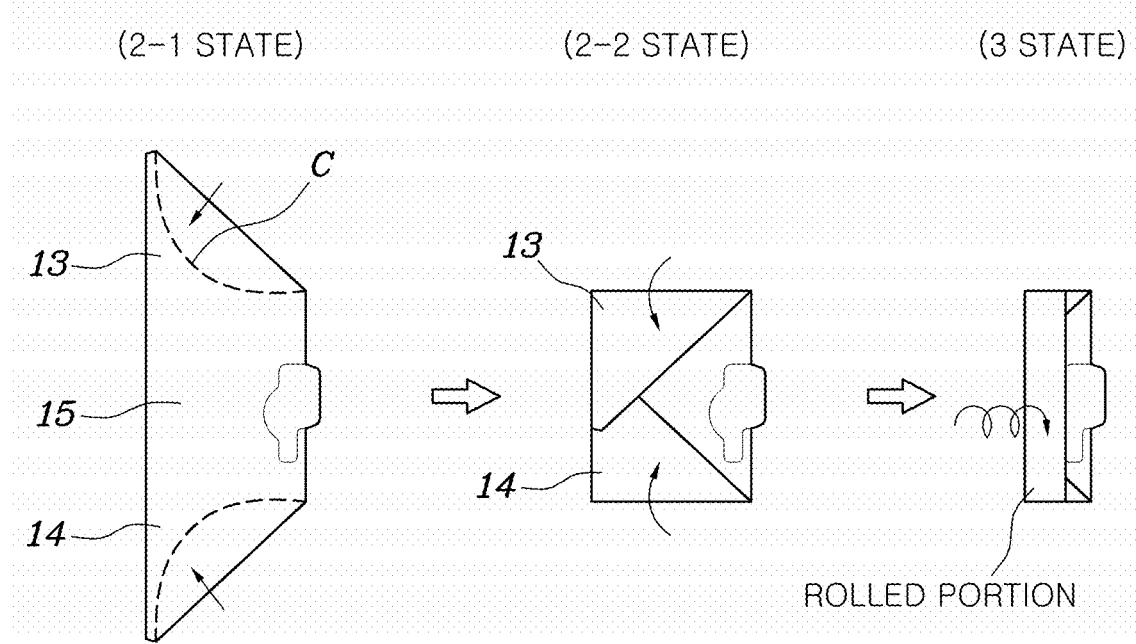
FIG. 4 is a view showing a second embodiment of the process of folding the airbag cushion according to the present invention into a third state from a second state.

FIG. 4 is a view showing a second embodiment of the process of folding the airbag cushion 10 into the third state from the second state, in which the second state can be achieved by folding the airbag cushion 10 into the 2-2 state from the 2-1 state.

Referring to the figure, the rear corner c of the upper end 13 of the airbag cushion 10 and the rear corner c of the lower end 14 of the airbag cushion 10 are folded inside forward in the first state, thereby implementing the 2-1 state in which the upper end 13 and the lower end 14 of the airbag cushion 10 are each formed in a triangular state.

Next, the triangular uppers end 13 and lower ends 14 are folded to the middle end 15 in the 2-1 state, whereby the airbag cushion 10 is folded in the 2-2 state having a rectangular shape.

Figure 5:
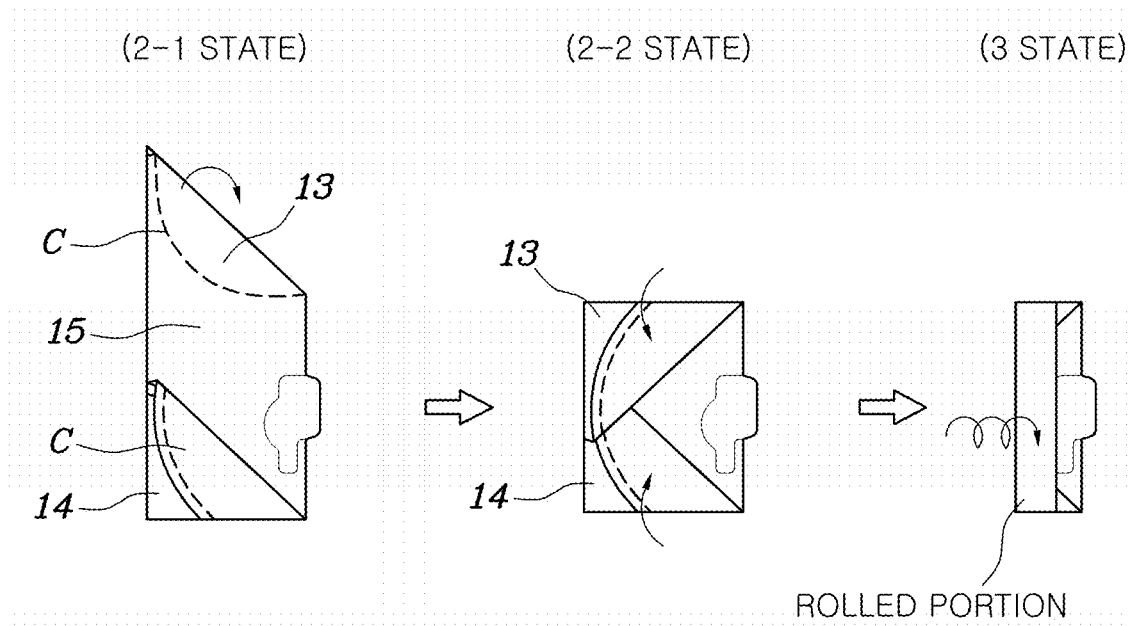
FIG. 5 is a view showing a third embodiment of the process of folding the airbag cushion according to the present invention into a third state from a second state.

FIG. 5 is a view showing a third embodiment of the process of folding the airbag cushion 10 into the third state from the second state, in which the second state can be achieved by folding the airbag cushion 10 into the 2-2 state from the 2-1 state.

Referring to the figure, a rear corner c of the upper end 13 of the airbag cushion 10 and a rear corner c of the lower end 14 of the airbag cushion 10 are folded forward over another side (the outer side of the cushion) in the first state, thereby implementing the 2-1 state in which the upper end 13 and the lower end 14 of the airbag cushion 10 are each famed in a triangular state.

Next, the triangular upper end 13 and lower end 14 are folded to the middle end 15 in the 2-1 state, whereby the airbag cushion 10 is folded in the 2-2 state having a rectangular shape.

That is, in all the first to third embodiments, since the entire front portion of the airbag cushion 10 is folded inside and then the portions of the upper end 13 and the lower end 14 are folded, the folded areas of the upper end 13 and the lower end 14 decrease in comparison to the related art, so the amount of gas to fill the portions of the upper end 13 and the lower end 14 is relatively reduced.

Accordingly, the portions of the upper end 13 and the lower end 14 quickly expand when the airbag cushion 10 expands, whereby the expansion time of the entire airbag cushion decreases.

Meanwhile, referring to FIGS. 3 to 5, it is possible to fold the airbag cushion 10 into a roll-shaped third state by rolling the front end of the airbag cushion 10 to the rear end in the second state. For reference, the airbag cushion 10 folded in this way can be mounted in an airbag housing.

That is, as described above, since the entire front portion of the airbag cushion 10 is formed inside, the front-rear length of the airbag cushion 10 decreases, whereby the section that is rolled decreases. Accordingly, the amount of rolling decrease to a half, so the airbag cushion 10 can be more easily assembled. Further, the expansion time of the rolled portion decreases when the airbag cushion 10 expands, so the expansion time of the airbag cushion 10 may be further reduced.

Meanwhile, a method of folding the airbag cushion of an airbag according to the present invention is described. First, the first end 11 of the airbag cushion 10 is folded inside toward the rear end 12 of the airbag cushion 10.

Next, the upper end 13 and the lower end 14 of the airbag cushion 10 are folded over the middle end 15.

Thereafter, the airbag cushion 10 is rolled, whereby folding the airbag cushion 10 is finished.

According to the configuration described above, when the airbag cushion 10 is folded, unlike the related art, the front end 11 of the airbag cushion 10 is folded first inside the rear end 12 of the airbag cushion 10 and then the other portions are folded. Accordingly, not only the rolled portion and the portions of the upper end 13 and the lower end 14, but also the portion of the front end 11 simultaneously expand in the early stage of expansion, whereby the airbag cushion 10 more quickly expands and the expansion speed of the entire airbag cushion 10 is shortened.

Further, since the entire front portion of the airbag cushion 10 is primarily folded inside, when the airbag cushion 10 expands, gas is supplied to the entire front portion and the front portion relatively uniformly expands. Accordingly, the expansion force does not concentrate on any one side of the airbag cushion 10, thereby preventing damage to the cushion and the trim of a vehicle due to the expansion shock of the airbag cushion 10.

Although the present invention was described with reference to the detailed embodiments, it is apparent to those skilled in the art that the present invention may be changed and modified in various ways without the scope of the present invention and it should be noted that the changes and modifications are included in claims.

What is claimed is:

1. A method of folding an unfolded automotive side airbag cushion having first and second layers overlapping each other, the method comprising:
    folding a front end of the unfolded side airbag cushion toward a rear end of the side airbag cushion such that front portions of the first and second layers are positioned between rear portions of the first and second layers;
    after folding the front end toward the rear end, folding upper and lower end portions of the side airbag cushion toward an outer surface of the first or second layer; and
    after folding the upper and lower end portions toward the outer surface of the first or second layer, rolling the folded side airbag cushion.

2. The method of claim 1, wherein folding the front end toward the rear end of the side airbag cushion comprises folding the front end between the first and second layers until the front end contacts the rear end.

3. The method of claim 1, wherein folding the upper and lower end portions toward the outer surface of the first or second layer comprises:
    folding the upper and lower end portions toward the outer surface of the first layer such that the folded upper and lower end portions have a triangular shape; and
    folding the triangular-shaped upper and lower end portions toward the outer surface of the first layer such that the folded side airbag cushion has a rectangular shape.

4. The method of claim 1, wherein folding the upper and lower end portions toward the outer surface of the first or second layer comprises:
    folding a rear corner of the upper end portion such that upper rear corner portions of the first and second layers are positioned between the rear portions of the first and second layers and the folded upper end portion has a triangular shape;
    folding a rear corner of the lower end portion such that lower rear corner portions of the first and second layers are positioned between the rear portions of the first and second layers and the folded lower end portion has a triangular shape; and
    folding the triangular-shaped upper and lower end portions toward the outer surface of the first layer such that the folded side airbag cushion has a rectangular shape.

5. The method of claim 1, wherein folding the upper and lower end portions toward the outer surface of the first or second layer comprises:
    folding rear corners of the upper and lower end portions toward the outer surface of the first layer such that the folded upper and lower end portions have a triangular shape; and
    folding the triangular-shaped upper and lower end portions toward the outer surface of the second layer such that the folded side airbag cushion has a rectangular shape.

6. The method of claim 1, wherein rolling the folded side airbag cushion comprises rolling the folded side airbag cushion in a direction from a front to a rear of the folded side airbag cushion.

7. A side airbag cushion for a vehicle, having first and second layers overlapping each other and produced by a process comprising:
    folding a front end of an unfolded side airbag cushion toward a rear end of the side airbag cushion such that front portions of the first and second layers are positioned between rear portions of the first and second layers;
    after folding the front end toward the rear end, folding upper and lower end portions of the side airbag cushion toward an outer surface of the first or second layer; and
    after folding the upper and lower end portions toward the outer surface of the first or second layer, rolling the folded side airbag cushion.

8. The side airbag cushion of claim 7, wherein folding the front end toward the rear end of the side airbag cushion comprises folding the front end between the first and second layers until the front end contacts the rear end.

9. The side airbag cushion of claim 7, wherein folding the upper and lower end portions toward the outer surface of the first or second layer comprises:

folding the upper and lower end portions toward the outer surface of the first layer such that the folded upper and lower end portions have a triangular shape; and folding the triangular-shaped upper and lower end portions toward the outer surface of the first layer such that the folded side airbag cushion has a rectangular shape.

10. The side airbag cushion of claim 7, wherein folding the upper and lower end portions toward the outer surface of the first or second layer comprises:

folding a rear corner of the upper end portion such that upper rear corner portions of the first and second layers are positioned between the rear portions of the first and second layers and the folded upper end portion has a triangular shape;

folding a rear corner of the lower end portion such that lower rear corner portions of the first and second layers are positioned between the rear portions of the first and second layers and the folded lower end portion has a triangular shape; and folding the triangular-shaped upper and lower end portions toward the outer surface of the first layer such that the folded side airbag cushion has a rectangular shape.

11. The side airbag cushion of claim 7, wherein folding the upper and lower end portions toward the outer surface of the first or second layer comprises:

folding rear corners of the upper and lower end portions toward the outer surface of the first layer such that the folded upper and lower end portions have a triangular shape; and folding the triangular-shaped upper and lower end portions toward the outer surface of the second layer such that the folded side airbag cushion has a rectangular shape.

12. The side airbag cushion of claim 7, wherein rolling the folded side airbag cushion comprises rolling the folded side airbag cushion in a direction from a front to a rear of the folded side airbag cushion.

* * * * *